(No Model.) 2 Sheets—Sheet 1.
P. E. DOOLITTLE.
BRAKE MECHANISM FOR BICYCLES.
No. 576,562. Patented Feb. 9, 1897.
*Fig. 1.*
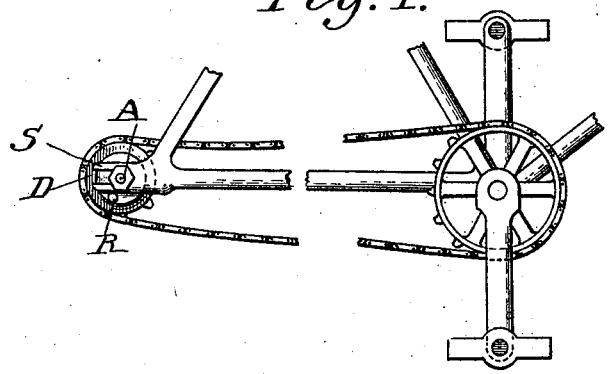
*Fig. 2.*
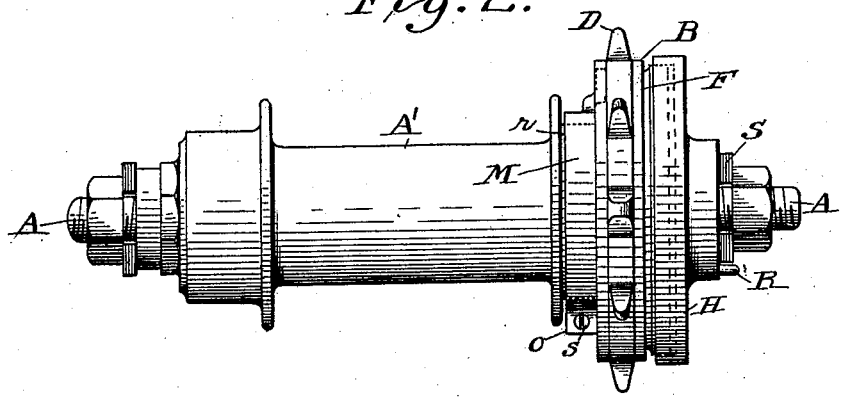
*Fig. 3.*    *Fig. 4.*    *Fig. 5.*
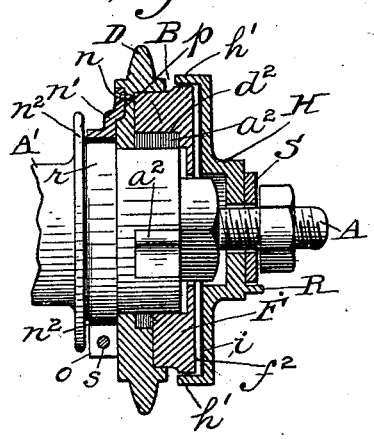 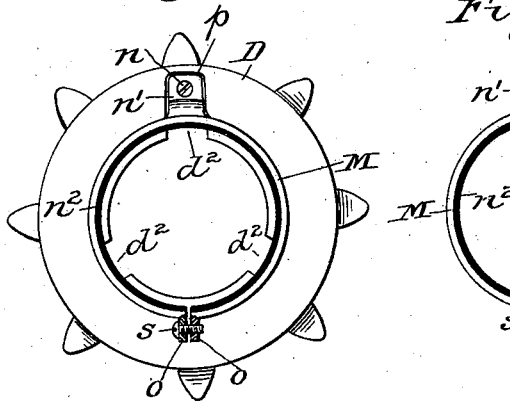 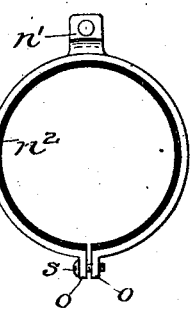
Witnesses
Jas. H. Blackwood
Albert B. Blackwood
Inventor
Perry E. Doolittle
by M. Doolittle & Son
Attorneys
THE NORRIS PETERS CO., PHOTO-LITHO., WASHINGTON, D. C.

(No Model.) 2 Sheets—Sheet 2.

P. E. DOOLITTLE.
BRAKE MECHANISM FOR BICYCLES.

No. 576,562. Patented Feb. 9, 1897.

Witnesses
Jos. H. Blackwood
Albert B. Blackwood.

Inventor
Perry E. Doolittle
by M. Doolittle & Son
Attorneys

UNITED STATES PATENT OFFICE.

PERRY ERNEST DOOLITTLE, OF TORONTO, CANADA.

BRAKE MECHANISM FOR BICYCLES.

SPECIFICATION forming part of Letters Patent No. 576,562, dated February 9, 1897.

Application filed September 18, 1896. Serial No. 606,190. (No model.)

*To all whom it may concern:*

Be it known that I, PERRY ERNEST DOOLITTLE, a subject of the Queen of Great Britain, residing at Toronto, in the county of York and Province of Ontario, Dominion of Canada, have invented certain new and useful Improvements in Brake Mechanism for Bicycles and other Vehicles; and I do hereby declare the following to be a full, clear, and exact description of the invention, such as will enable others skilled in the art to which it appertains to make and use the same.

My invention relates to improvements in brake mechanism for bicycles and similar vehicles; and it consists of certain improvements upon the inventions set forth in my applications, Serial Nos. 588,912 and 603,245.

The improvements set forth in those applications relate to an automatic friction-brake connected with and operated by the driving means and provided with locking means to lock the brake in any position it may be fixed by the operation thereof until such locking action is overcome by the exertion of sufficient pressure upon the driving means.

My present improvements, while embodying many of the principal features of said devices, have for their objects to improve and strengthen the locking means referred to above, to increase the holding force and stiffen the action of the same, and to provide means whereby such action and holding force may be regulated to any desired strength in a simple and convenient manner.

To these ends my invention consists of the means as hereinafter described and claimed.

My invention is illustrated in the accompanying drawings, in which—

Figure 6:
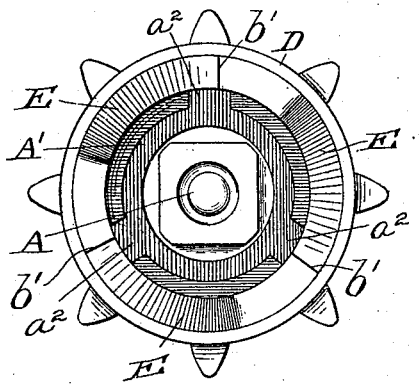
Figure 7:
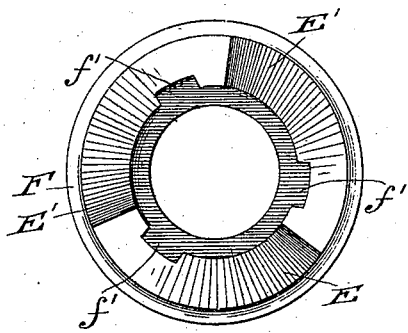
Figure 8:
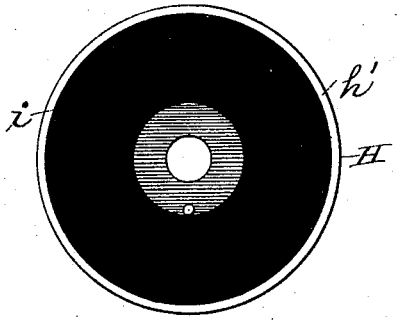
Figure 9:
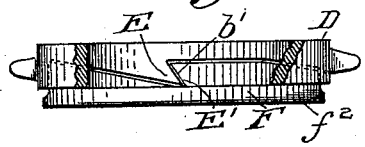

Figure 1 is a side view in elevation of a pedal-shaft, chain, and sprocket-wheel with my invention attached; Fig. 2, a plan of the axle and hub of the driving-wheel with sprocket and brake mechanism; Fig. 3, a view in elevation, partly in vertical section, of matters in Fig. 2; Fig. 4, an inner face view of sprocket with clamp attached; Fig. 5, a detail of clamp; Fig. 6, an outer face view of sprocket; Fig. 7, an inner face view of movable brake-disk; Fig. 8, an inner face view of friction-disk; and Fig. 9, a detail plan view of sprocket-wheel and brake-disk, the former broken away to show engaging sections.

Referring to the drawings, A A' are the spindle and hub, respectively, of a rear driving-wheel, and B is the sprocket end of the hub.

D is the sprocket-wheel on said driving-wheel. The sprocket end of the hub B is provided on its periphery with projections or lugs $a^2$ and the sprocket D with recesses $d^2$ on its inner circumference. When the sprocket is slid onto the hub, the projections $a^2$ of the latter enter the recesses $d^2$. The sprocket is then pushed beyond the lugs to its seat and turned so as to bring the recesses $d^2$ out of engagement with the lugs, whereby the sprocket is held against lateral movement on the hub by said lugs.

On its outer face the sprocket D is provided with raised teeth or sections E in the form of inclines, the highest parts of which terminate in abrupt inwardly-beveled shoulders $b'$.

F is a brake-disk on the hub, provided on its inner face with similar teeth E' and shoulders. These respective teeth or sections together form a clutch, and when set together the shoulders $b'$ of the respective teeth engage, their inner beveled faces meeting, and the inclined faces of the teeth are in close and continuous contact, so that in their locked position the thinnest portions of the brake-disk rest against the thickest portions of the sprocket-wheel. The disk F is provided with recesses $f'$, which, when this disk is placed on the hub, engage with the lugs $a^2$. The disk is by this engagement made to rotate with the hub, but is also at the same time permitted a lateral movement thereon.

H is a disk plate having an inwardly-extending annular rim $h'$ and rigidly mounted on the spindle A. Within the rim $h'$ the face of the plate is provided with a frictional surface $i$, which may be composed of leather, rubber, or other suitable frictional material. The outer plain face $f^2$ of the brake-disk F acts as a friction-plate and is adapted to enter within the rim $h'$ of disk H and impinge against said disk, as hereinafter described.

R is a pin or lug on the outer face of the disk H to contact with the forked frame S for the purpose of preventing the disk from turning with the brake-disk when the pressure is applied.

M is a circular metal collar or band secured to the inner face of the sprocket D by means of a screw $n$, passing through an arm or projection $n'$ of the band. The arm $n'$ is bent outward beyond the edge of the band, as shown in Fig. 3, and is adapted to fit into a depression $p$ in the sprocket, so as to be flush with the surface thereof. The engagement of this depression and the projecting arm of the band would alone be sufficient to keep the sprocket and band in close contact and prevent their separate rotation; but to render certain the continuous engagement of these parts I prefer to employ the additional screw connection above described. The band M may be provided on its inner circumference with a suitable frictional material $n^2$, and is adapted to overlap and bear against the peripheral surface of the rim $r$ of the hub, thereby constituting a friction clamp or lock for said sprocket and brake mechanism, as and for the purpose hereinafter described.

At a point on its circumference directly opposite the band projection $n'$ the band-clamp is split or opened and there provided with two lugs $o$ $o$, which are joined by an adjusting-screw $s$. By means of this split formation of the band and the adjusting and retaining screw for connecting the ends of said band it will be seen that the pressure of said clamp upon the hub can be adjusted to any desired degree.

The operation of the device is as follows: In the act of back-pedaling or reversing the movement of the wheel to check its forward direction the power exerted on the sprocket tends to turn it slightly backward on the hub. This reverse action causes the engaging sections of the respective faces of sprocket and brake-disks to ride upon each other and forces the brake-disk out against the face of the friction-disk H. The pressure of the brake-disk against the friction-disk increases as the inclines rise upon each other. The same backward movement of the sprocket overcomes the resistance of the clamp caused by its frictional contact with the rim $r$, and the clamp is turned back on the hub with the sprocket. As soon as the backward pressure on the sprocket is relieved the pressure of the clamp upon the hub is such as to still hold the sprocket-wheel turned back and the brake-disk against the friction-disk until released by a sufficient impelling force exerted in a forward direction on the driving means, which carries the sprocket beyond the holding force of the band-clamp. The adjusting-screw $s$ allows the band to be regulated to any desired degree of clamping force, and, if so desired, the band may be screwed up so tightly as to prevent the operation of the brake altogether.

When the sprocket-wheel and brake-disk are locked together in their normal condition, the resistance of the friction-clamp against the hub prevents any accidental operation of these parts due to slight and unintentional back pressure on the driving means, and holds them in this position until sufficient reverse pressure on the driving means, caused by the exertion of considerable force, is again brought to bear to overcome such resistance. In such a construction the strength of the locking action of said clamp can be regulated to accommodate the style of vehicle employed and the character of the route traversed, and in the case of a bicycle be adjusted to the strength and skill of the rider.

It will be seen that the same brake action of the two disks carrying the engaging inclined teeth may be accomplished whatever may be the means of reversing the rotary disk and whether the same is a sprocket-disk or not whenever such action is sufficient to force the inclined teeth upon each other, the amount of friction produced being controlled by the amount of back pressure exerted. The action of the brake is entirely automatic, being controlled by and corresponding to the pressure exerted by the rider in checking the forward movement of the wheel in back-pedaling.

The parts of the brake are made to fit so closely as to wholly exclude dust and dirt.

Having thus described my invention, what I claim is—

1. In a bicycle or other vehicle in combination with the driving-wheel and driving means, an automatic brake mechanism on said driving-wheel connected with and operated by the driving means, and a frictional locking-clamp on the hub of said wheel to normally prevent the operation of said brake mechanism and to lock it when so operated, substantially as described.

2. In a bicycle or other vehicle provided with driving means, an automatic brake mechanism mounted on a suitable support and connected with and operated by said driving means, a locking-clamp on said support, said clamp provided with an inner frictional surface to engage said support, and means to adjust the pressure of said clamp, said clamp adapted to normally prevent the operation of said brake and to lock it when so operated, substantially as described.

3. In a bicycle or other vehicle, in combination with the driving-wheel and driving means, a friction-disk mounted on the axis of said wheel, a second disk mounted on a support and directly connected with the driving means, a brake-disk on said support between said driven disk and friction-disk, means to force said brake-disk against the friction-disk to retard the forward movement of the vehicle, and a band-clamp secured to said driven disk and bearing against the hub of said driving-wheel to normally prevent the engagement of said brake-disk and friction-disk and to lock them when so engaged, substantially as described.

4. In a bicycle or other vehicle in combination with the driving-wheel and driving means, a disk to which the driving means are applied, a brake mechanism connected with said driven disk, said brake mechanism operated by the reverse movement of said driving means, a circular band-clamp engaging said driven disk, a pressure-regulating screw joining the ends of said clamp, and a rim on the hub of said wheel on which said clamp bears when the brake is operated, substantially as and for the purpose described.

In testimony whereof I affix my signature in presence of two witnesses.

PERRY ERNEST DOOLITTLE.

Witnesses:
    PERCY E. MATTOCKS,
    EDMUND S. SNEWIN.